Figure 1:
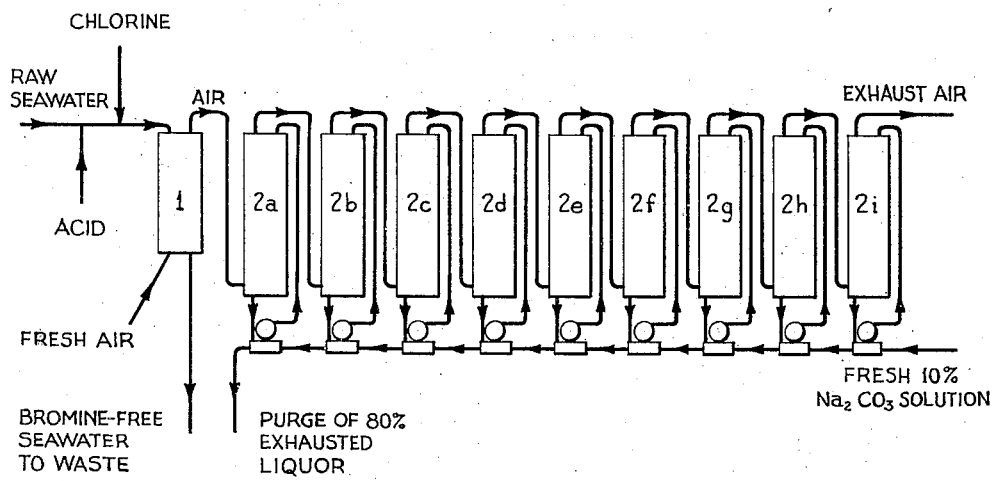

Arthur Tandy Williamson
Frank Bradley
INVENTORS

BY
Edwin C. Woodhouse
ATTORNEY

Patented Nov. 6, 1945

2,388,586

UNITED STATES PATENT OFFICE 2,388,586

ABSORPTION OF BROMINE

Arthur Tandy Williamson, Northwich, and Frank Bradley, London, England, assignors to Imperial Chemical Industries Limited, a corporation of Great Britain Application July 18, 1941, Serial No. 402,930
In Great Britain August 16, 1940

9 Claims. (Cl. 23—85)

This invention relates to the absorption of bromine from bromine-bearing gases, in particular from air mixtures obtained by the air-blowing of oxidised, e. g. chlorinated sea water or other salt brine.

In a known process for the recovery of bromine from brines containing small amounts of combined bromine, the brine is acidified (preferably to pH 3–4), chlorinated to liberate the bromine and blown with air to remove the bromine from solution in the brine; the bromine-containing air mixture is then washed with a constantly recirculated alkaline-reacting medium such as sodium carbonate solution, which first fixes the bromine as bromide and hypobromite and ultimately as bromide and bromate.

It is disclosed in Patent 2,245,514, issued to A. T. Williamson on June 10, 1941, that after the absorption of relatively little bromine and before exhaustion of the alkali carbonate is complete, there may be a back pressure of bromine exerted by the absorption liquor commensurate with the partial pressure of bromine in the gas to be stripped thereof. The back pressure opposes absorption of bromine from the gas, and it is the difference between the partial pressure of bromine in the gas and the back pressure exerted by the liquor which determines the efficiency of absorption.

We have found that the back pressure of bromine exerted by the medium, and hence the rate of absorption of bromine in said medium, depends on the carbon dioxide content of the gas from which bromine is being absorbed. In particular, we have found that this bromine back-pressure may be decreased by decreasing the carbon dioxide content of the gas passing through the absorption system and any such decrease in the back pressure of bromine increases the rate of bromine absorption.

One object of the present invention is to provide an improved process of absorbing bromine from gas mixtures containing bromine and carbon dioxide, by means of an alkaline reacting absorption medium, in which a high rate of absorption of bromine is attained. A further object is to provide such a process in which, for a given total rate of bromine absorption, a smaller number of absorption towers can be used than when operating according to known practice.

According to our invention, in a process for the absorption of bromine from gases resulting from the blowing of dilute bromine-containing liquors with air or other suitable gas, in which the said gases are treated with a constantly recirculated alkaline reacting absorption liquor, at least part of the carbon dioxide content of the system is removed before the bromine-containing gas is brought into contact with the absorption liquor.

In the case of bromine-containing air mixtures obtained by the air-blowing of chlorinated acidified brines, the carbon dioxide in the air mixture comes from two sources:

(a) The carbon dioxide present in the initial air
(b) The carbon dioxide liberated on acidification of the brine which contains carbonates and bicarbonates, and removed with the air-bromine mixture on air-blowing the brine.

In addition, $CO_2$ is derived from a third source when sodium carbonate solution is used as absorption medium, since $CO_2$ is generated in the absorption system by the reaction between bromine and the sodium carbonate. The rise in partial pressure of $CO_2$ due to this reaction will be equal to the fall in partial pressure of bromine in the air passing through the absorption system and in general will be small compared with the partial pressure of $CO_2$ due to sources $a$ and $b$. In general it is preferred to use, as alkaline reacting absorption medium, an aqueous solution of sodium carbonate containing 3–12 per cent by weight of $Na_2CO_3$.

With normal blowing rates and with most brines the partial pressure of carbon dioxide due to source $b$ will exceed that due to source $a$. In a typical case of sea-water, the partial pressure of carbon dioxide in the air-mixture resulting from sources $a$ and $b$ are 350 microatmospheres and 850 microatmospheres respectives. The absolute value of the partial pressure of carbon dioxide due to source $b$ will, of course, depend on the amount of air used and the concentration of free carbon dioxide in the acidified brine.

The process of the invention may be operated by decreasing the carbon dioxide content of the gas due to either or both of these sources $a$ and $b$.

Decrease in the carbon dioxide due to source $b$ may be effected by modifying the brine acidification-oxidation-blowing processes so as to remove first the carbon dioxide and then the bromine from the brine. For example, the brine may be acidified and air-blown to remove carbon dioxide before oxidation (e. g. chlorination) and then oxidised and air-blown with fresh air to remove bromine. A further method is to remove the combined carbon dioxide before the acidification stage by precipitation by means of substances, e. g. lime, which form insoluble compounds therewith, the precipitate being removed before acidification.

The carbon dioxide content due to source $a$ may be decreased by absorption in an alkaline-reacting medium or water or the like, thereby effecting partial or complete removal thereof.

A known method of operation is illustrated in Example 1, and the improved process of the present invention is illustrated in Examples 2 and 3. In these three examples, the volume of liquor associated with each bromine absorption tower is 0.556 cubic metre in every case.

A modification of the known method, as described in the aforesaid Patent 2,245,514, shows that the number of bromine absorption towers required for a given duty can be reduced by increasing the volume of absorption liquor, associated with at least one and preferably with each tower, to more than 5 cubic metres for each kg. of bromine absorbed per minute in the series as a whole. This effect is shown in Example 1A, in which the volume associated with each tower is 1.43 cubic metres which corresponds to about 8.7 cubic metres for each kg. of bromine absorbed per minute in the series.

The application of the improved process of the present invention in conjunction with the process of Patent 2,245,514 is shown in Example 2A, where the volume of liquor associated with each tower is again 1.43 cubic metres.

In all the examples described below, the operating temperature is 10° C.

*Example 1*

In the accompanying drawing, Figure 1 represents a diagrammatic flowsheet of a known process for recovering bromine from sea water in which sea water is acidified, chlorinated and blown with air and the resultant bromine-carbon dioxide-air mixture scrubbed with alkaline liquor. The raw seawater is acidified to pH 3.5, chlorinated and passed into a stripping tower 1 where a stream of fresh air takes up the greater part of the dissolved bromine together with a large quantity of carbon dioxide which has been produced by the acidification of the sea water. (The flow of raw sea water is 200 cubic metres per hour and the air flow rate is 12,500 cubic metres per hour.) This air leaving the so-called "stripping tower" contains bromine at a partial pressure of $120 \times 10^{-6}$ atmospheres and total carbon dioxide at a partial pressure of $1200 \times 10^{-6}$ atmospheres.

The bromine-bearing air is passed through a series of absorption towers, $2a$, $2b$ etc. to $2i$, where it is scrubbed with continuously circulating sodium carbonate solution. Each absorption tower is 7 ft. long by 3 ft. wide and is filled to a depth of 6¼ feet with stacked 3 inch by 3 inch by ¼ inch stoneware rings. The volume of liquor associated with each tower is 0.556 cubic metre and the rate of circulation of the liquor through each tower is 16.7 cubic metres per hour. The absorption liquor is purged away from the first tower for bromine recovery when its degree of exhaustion is 80% of the stoichiometric value, and a compensating supply of fresh sodium carbonate solution containing 10 per cent by weight $Na_2CO_3$ is fed into the last tower of the series. The removal of absorption liquor from the first tower is balanced by the introduction of make-up liquor from the second tower, and so on. The rates of flow of each purge and make up are 0.074 cubic metre per hour.

Operating under these conditions it is found that nine absorption towers are necessary to reduce the partial pressure of the bromine in the effluent air to less than $3.6 \times 10^{-6}$ atmospheres, i. e. to absorb 97 per cent by weight of the bromine in the initial air. It should be borne in mind that an appreciably higher exit partial pressure of bromine is generally regarded as a public nuisance, apart from the loss of valuable bromine.

*Example 2*

Figure 2:
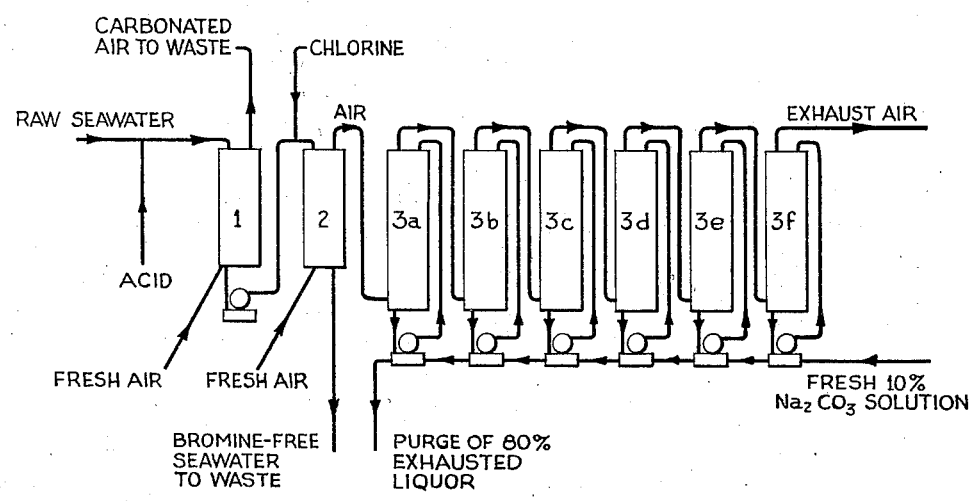

Figure 2 represents a diagrammatic flowsheet of a process which illustrates an application of the present invention, involving a reduction of the $CO_2$ in the system due to source $b$. Raw sea water is acidified to pH 3.5 and passed at a rate of 200 cubic metres per hour through a "decarbonating" tower 1 which measures 6 feet long by 6 feet wide and which is packed to a depth of 3½ feet with 1 inch by 1 inch by 3/32 inch rings (disposed at random). The acidified sea water passing through this tower is scrubbed with a countercurrent stream of air (200 cubic metres per hour) which removes most of the dissolved carbon dioxide that has been liberated by the action of the acid on the carbonates and bicarbonates in the sea water. The carbon dioxide-laden air leaving the decarbonating tower is discharged to the atmosphere.

The "decarbonated" seawater is now chlorinated and treated in precisely the same way as in the known process described above. Thus, the decarbonated and chlorinated sea water is passed through the stripping tower 2 where a stream of 12,500 cubic metres per hour of fresh air sweeps out most of the liberated bromine together with the small amount of carbon dioxide which has not been removed in the decarbonating tower. The air leaving the stripping tower contains bromine at a partial pressure of 120 microatmospheres and carbon dioxide at a partial pressure of only 400 microatmospheres. (This represents the carbon dioxide present in the initial air (350 microatmospheres) and the small amount of the dissolved carbon dioxide which had not been removed from the acidified sea water in the decarbonating tower.)

The bromine-bearing air is then passed through a series of absorption towers, $3a$, $3b$ etc. to $3f$, where it is scrubbed with continuously circulating sodium carbonate solution, the makeup of which is supplied as 10 per cent $Na_2CO_3$ solution. Each tower has associated with it 0.556 cubic metre of absorption liquor.

Using the same type of absorption apparatus and the same method of operation as in the process of Fig. 1 operating under these conditions, it is found that the partial pressure of bromine in the air is reduced to below $3.6 \times 10^{-6}$ atmospheres using only six towers instead of nine.

*Example 3*

This example illustrates a further application of the present invention, involving a reduction of the $CO_2$ in the system due to both sources $a$ and $b$.

Raw sea water is acidified to pH 3.5, and passed at a rate of 200 cubic metres per hour through a "decarbonating" tower which measures 6 feet long by 6 feet wide and which is packed to a depth of 3½ feet with 1 inch by 1 inch by 3/32 inch rings (disposed at random). The acidified sea water passing through this tower is scrubbed with a countercurrent stream of air 2000 cubic metres per hour which removes most of the carbon dioxide that has been liberated by the action of the acid on the carbonates and bicarbonates in the sea water. The carbon dioxide-laden air leaving the decarbonating tower is discharged to the atmosphere, and the "decarbonated" sea water is now chlorinated and fed into the bromine-stripping tower as in Example 2.

Meanwhile, a stream of fresh air (12,500 cubic metres per hour) is led into an extra scrubbing tower, 7 feet long by 3 feet wide, filled to a depth of 6¼ feet with stacked 3 inch by 3 inch by ¼ inch stoneware rings: where it is scrubbed with a suspension of $Ca(OH)_2$ in water containing 1 per cent CaO by weight, which is continuously recirculated through the tower at a rate of 16.7 cubic metres per hour. The liquor from this circuit is purged away at a rate of 1.2 cubic metres per hour, and fresh quantities of the 1 per cent CaO suspension are added at the same rate to compensate for the $Ca(OH)_2$ and $CaCO_3$ removed in the purge.

The partial pressure of $CO_2$ in the fresh air passing through this extra scrubbing tower is reduced from about 350 micro-atmospheres to about 50 microatmospheres. This "decarbonated" air is then passed through the bromine-stripping tower where it liberates most of the bromine from the "decarbonated" and chlorinated sea water, together with the small amount of carbon dioxide still dissolved in the sea water. The air leaving the stripping tower contains bromine at a partial pressure of 120 microatmospheres and carbon dioxide at a partial pressure of only 100 microatmospheres.

The bromine-bearing air is then passed through a series of absorption towers, which are identical in size and method of operation with those described in Example 1, and where it is scrubbed with continuously circulating sodium carbonate solution. Each tower has associated with it 0.556 cubic metres of absorption liquor. In this case, the partial pressure of bromine in the air is reduced to below $3.6 \times 10^{-6}$ atmospheres using only 4 absorption towers instead of the 9 required in Example 1.

*Example 1A*

The acidification, chlorination and air blowing of the sea water in this example are identical in every respect with the corresponding steps described in Example 1.

The bromine-bearing air is passed through a series of absorption towers where it is scrubbed with continuously circulating sodium carbonate solution.

The structure and operation of these towers is identical in every respect with those described in Example 1, except that the volume of liquor associated with each tower is 1.43 cubic metres.

Operating under these conditions it is found, as described in Patent 2,245,514, that seven absorption towers are necessary to reduce the partial pressure of the bromine in the effluent air to less than $3.6 \times 10^{-6}$ atmospheres.

*Example 2A*

In this example the preliminary steps of acidification, decarbonation, chlorination and air-blowing of the sea water, are identical in every respect with the corresponding steps described in Example 2. The bromine-bearing air is then passed through a series of absorption towers, identical in all respects with those described in Example 1A, each tower having associated with it 1.43 cubic metres of liquor.

Operating under these conditions it is found that five absorption towers are necessary to reduce the partial pressure of bromine in the effluent air to less than $3.6 \times 10^{-6}$ microatmospheres.

These examples are summarised in the following table, which shows the minimum number of absorption towers required to absorb 97% of the bromine from the air-bromine mixture which enters the absorption system, as a function of the partial pressure of $CO_2$ in the mixture and of the volume of liquor associated with each tower.

It must be remembered that the absorption towers described in these examples operate at such an efficiency that even if the back-pressure of bromine exerted by the absorption liquor were reduced to zero by any means, we should still require three absorption towers to effect the specified 97% removal of bromine.

In the table given below, the symbols have the following meanings:

$P_{CO_2}$ = Partial pressure of $CO_2$, in microatmospheres, in the air-bromine mixture entering the bromine absorption system and the amount of the partial pressure is shown at the top of each of columns 2, 3 and 4 of each of the following tables.

V = Volume of absorption liquor associated with each tower in cubic metres, in the first column of each table.

The numerals 4 to 10, inclusive, appearing in columns 2, 3 and 4 of the tables, represent the number of towers in each case.

(The figures in parentheses refer to the example numbers.)

| $P_{CO_2}$ / V | 1200 | 400 | 100 |
|---|---|---|---|
| 0.556 | 9 (1) | 6 (2) | 4 (3) |
| 1.43 | 7 (1A) | 5 (2A) | --- |

Since the towers used for decarbonating, stripping and absorption are all of comparable size and construction, we can compare the total number of towers of all types required for the operation of the complete plant as in the following table:

| $P_{CO_2}$ / V | 1200 | 400 | 100 |
|---|---|---|---|
| 0.556 | 10 (1) | 8 (2) | 7 (3) |
| 1.43 | 8 (1A) | 7 (2A) | --- |

Thus, the invention effects a saving in the total number of towers required for a given duty.

What we claim is:

1. In a process for the recovery of alkali bromide and bromate from aqueous salt solutions containing bromine compounds and combined carbon dioxide, wherein the solutions are acidified, oxidized to liberate free bromine and then blown with air to remove the free bromine which is then absorbed in a series of volumes of constantly recirculated alkaline-reacting absorption medium, the steps which comprise converting a substantial proportion of the combined carbon dioxide to an insoluble removable form and then removing such converted carbon dioxide from the solutions prior to oxidizing the solutions.

2. In a process for the recovery of alkali bromide and bromate from aqueous salt solutions containing bromine compounds and combined carbon dioxide, wherein the solutions are acidified, oxidized to liberate free bromine and then blown with air to remove the free bromine which is then absorbed in a series of volumes of constantly recirculated alkaline-reacting absorption medium, the steps which comprise converting a substantial proportion of the combined carbon dioxide to an insoluble removable form and then removing such converted carbon dioxide from the solutions prior to oxidizing such solutions and removing a substantial proportion of the natural carbon dioxide content of the air prior to blowing the solutions therewith.

3. A process for the recovery of alkali bromide and bromate from aqueous salt solutions containing bromine compounds and combined carbon dioxide, which comprises acidifying the solution whereby free carbon dioxide is liberated, removing from the solution a substantial proportion of the free carbon dioxide by blowing with an inert gas, oxidizing the resulting solution to liberate free bromine, removing the free bromine from the solution by blowing with air and then contacting the bromine containing gas successively with each of a plurality of bodies of alkaline-reacting absorption medium, circulated into and out of contact with said gas, whereby bromine is absorbed from said gas by said absorption medium and is largely converted into bromide and bromate therein.

4. A process for the recovery of alkali bromide and bromate from aqueous salt solutions containing bromine compounds and combined carbon dioxide, which comprises acidifying the solution whereby free carbon dioxide is liberated, blowing the acidified solution with air to remove a substantial proportion of the free carbon dioxide, oxidizing the resulting solution to liberate free bromine, removing the free bromine from the solution by blowing with air and then contacting the bromine containing gas successively with each of a plurality of bodies of alkaline-reacting absorption medium, circulated into and out of contact with said gas, whereby bromine is absorbed from said gas by said absorption medium and is largely converted into bromide and bromate therein.

5. A process for the recovery of alkali bromide and bromate from aqueous salt solutions containing bromine compounds and combined carbon dioxide, which comprises adding to the solution a substance which reacts with the carbon dioxide to form an insoluble compound thereof, removing the resulting insoluble compound from the solution, acidifying the solution, oxidizing the resulting solution to liberate free bromine, removing the free bromine from the solution by blowing with air and then contacting the bromine containing gas successively with each of a plurality of bodies of alkaline-reacting absorption medium, circulated into and out of contact with said gas, whereby bromine is absorbed from said gas by said absorption medium and is largely converted into bromide and bromate therein.

6. A process for the recovery of alkali bromide and bromate from sea water containing bromine compounds and combined carbon dioxide, which comprises acidifying the sea water whereby free carbon dioxide is liberated, blowing the acidified sea water with air to remove a substantial proportion of the free carbon dioxide, chlorinating the resulting solution to liberate free bromine, removing the free bromine from the solution by blowing with air and then contacting the bromine containing gas successively with each of a plurality of bodies of alkaline-reacting absorption medium, circulated into and out of contact with said gas, whereby bromine is absorbed from said gas by said absorption medium and is largely converted into bromide and bromate therein.

7. A process for the recovery of alkali bromide and bromate from sea water containing bromine compounds and combined carbon dioxide, which comprises acidifying the sea water whereby free carbon dioxide is liberated, blowing the acidified sea water with air to remove a substantial proportion of the free carbon dioxide, chlorinating the resulting solution to liberate free bromine, removing the free bromine from the solution by blowing with air and then contacting the bromine containing gas successively with each of a plurality of bodies of alkaline-reacting absorption medium, circulated into and out of contact with said gas, whereby bromine is absorbed from said gas by said absorption medium and is largely converted into bromide and bromate therein, at least one of such bodies of absorption medium exceeding 5 cubic metres for each kg. of bromine absorbed per minute in the plurality of bodies of absorption medium as a whole.

8. A process for the recovering of alkali bromide and bromate from sea water containing bromine compounds and combined carbon dioxide, which comprises acidifying the sea water whereby free carbon dioxide is liberated, blowing the acidified sea water with air to remove a substantial proportion of the free carbon dioxide, chlorinating the resulting solution to liberate free bromine, removing the free bromine from the solution by blowing with air and then contacting the bromine containing gas successively with each of a plurality of bodies of alkaline-reacting absorption medium, circulated into and out of contact with said gas, whereby bromine is absorbed from said gas by said absorption medium and is largely converted into bromide and bromate therein, the alkaline-reacting absorption medium being aqueous sodium carbonate solution containing 3% to 12% by weight of sodium carbonate.

9. A process for the recovery of alkali bromide and bromate from sea water containing bromine compounds and combined carbon dioxide, which comprises acidifying the sea water whereby free carbon dioxide is liberated, blowing the acidified sea water with air to remove a substantial proportion of the free carbon dioxide, chlorinating the resulting solution to liberate free bromine, removing the free bromine from the solution by blowing with air from which a substantial proportion of the natural carbon dioxide content has been removed, and then contacting the bromine containing gas successively with each of a plurality of bodies of alkaline-reacting absorption medium, circulated into and out of contact with said gas, whereby bromine is absorbed from said gas by said absorption medium and is largely converted into bromide and bromate therein.

ARTHUR T. WILLIAMSON.
FRANK BRADLEY.

CERTIFICATE OF CORRECTION.

Patent No. 2,388,586. November 6, 1945.

ARTHUR TANDY WILLIAMSON, ET AL.

It is hereby certified that error appears in the printed specification of the above numbered patent requiring correction as follows: Page 1, second column, line 35, for "respectives" read --respectively--: page 2, first column, line 32, for "10° C." read --20° C.--; page 2, second column, line 21, Example 2, for "200 cubic" read --2,000 cubic--; line 50, for "$Na_2CO_2$" read --$Na_2CO_3$--; and that the said Letters Patent should be read with this correction therein that the same may conform to the record of the case in the Patent Office.

Signed and sealed this 5th day of February, A. D. 1946.

Leslie Frazer (Seal) First Assistant Commissioner of Patents.